(12) United States Patent
Gunasekaran et al.

(10) Patent No.: US 11,091,844 B2
(45) Date of Patent: Aug. 17, 2021

(54) METHOD TO MAKE FLEXIBLE, FREE-STANDING GRAPHENE PAPER AND PRODUCT FORMED THEREBY

(71) Applicant: Wisconsin Alumni Research Foundation, Madison, WI (US)

(72) Inventors: Sundaram Gunasekaran, Madison, WI (US); Omer Sadak, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 288 days.

(21) Appl. No.: 16/175,890

(22) Filed: Oct. 31, 2018

(65) Prior Publication Data

US 2019/0194023 A1 Jun. 27, 2019

Related U.S. Application Data

(60) Provisional application No. 62/579,369, filed on Oct. 31, 2017.

(51) Int. Cl.
| | | |
|---|---|---|
| *C25B 1/00* | (2021.01) | |
| *C01B 32/19* | (2017.01) | |
| *C01B 32/198* | (2017.01) | |

(52) U.S. Cl.
CPC ............... *C25B 1/00* (2013.01); *C01B 32/19* (2017.08); *C01B 32/198* (2017.08); *C01B 2204/02* (2013.01); *C01B 2204/22* (2013.01); *C01P 2002/82* (2013.01); *C01P 2002/85* (2013.01); *C01P 2004/03* (2013.01); *C01P 2006/40* (2013.01)

(58) Field of Classification Search
CPC ........................................................ C25B 1/00
See application file for complete search history.

(56) References Cited

U.S. PATENT DOCUMENTS

| | | | |
|---|---|---|---|
| 8,227,685 B2 | 7/2012 | Choi | |
| 9,776,378 B2 | 10/2017 | Choi | |
| 2013/0001089 A1 | 1/2013 | Li et al. | |
| 2014/0335011 A1* | 11/2014 | Dubois | ................. C01B 32/192 |
| | | | 423/448 |
| 2015/0275378 A1* | 10/2015 | Koo | ........................ C01B 32/19 |
| | | | 205/615 |

(Continued)

FOREIGN PATENT DOCUMENTS

| | | |
|---|---|---|
| KR | 20090054708 | 6/2009 |
| KR | 20100136576 A | 12/2010 |

OTHER PUBLICATIONS

Blomquist et al., *Large-Scale Production of Nanographite by Tube-Shear Exfoliation in Water.* Plos One, 2016. 11(4).

(Continued)

*Primary Examiner* — Nicholas A Smith
(74) *Attorney, Agent, or Firm* — Joseph T. Leone, Esq.; DeWitt LLP

(57) ABSTRACT

A method to make free-standing graphene sheets and the free-standing graphene sheets so formed. The method includes the steps of exfoliating partially oxidized graphene from a carbon-containing electrode into an aqueous solution, acidifying the aqueous solution, and separating from the acidified solution partially oxidized graphene sheet. The partially oxidized graphene is then dried to yield free-standing graphene sheet having a carbon-to-oxygen ratio of at least about 8.0.

15 Claims, 7 Drawing Sheets

(56) References Cited

U.S. PATENT DOCUMENTS

2019/0233291 A1* 8/2019 Achee ................. C25B 1/00

OTHER PUBLICATIONS

Bonaccorso et al., *Production and processing of graphene and 2d crystals*. Materials Today, 2012. 15(12): p. 564-589.

Chang et al., *Eco friendly synthesis of graphene nanoplatelets*. Journal of Materials Chemistry A, 2016. 4(40): p. 15281-15293.

Cong et al., *Flexible graphene-polyaniline composite paper for high-performance supercapacitor*. Energy & Environmental Science, 2013. 6(4): p. 1185-1191.

Ferrero et al., *Flexible, Free-Standing and Holey Graphene Paper for High-Power Supercapacitors*. ChemNanoMat, 2016. 2(11): p. 1055-1063.

Huang et al., *Graphene-based electrodes*. Adv Mater, 2012. 24(45): p. 5979-6004.

Huang et al., *Highly efficient electrolytic exfoliation of graphite into graphene sheets based on Li ions intercalation-expansion-microexplosion mechanism*. Journal of Materials Chemistry, 2012. 22(21): p. 10452-10456.

Jayasena et al., *A novel mechanical cleavage method for synthesizing few-layer graphenes*. Nanoscale Research Letters, 2011. 6.

Jeon et al., *Formation of Large-Area Nitrogen-Doped Graphene Film Prepared from Simple Solution Casting of Edge-Selectively Functionalized Graphite and Its Electrocatalytic Activity*. Chemistry of Materials, 2011. 23(17): p. 3987-3992.

Joshi et al., *Assembly of one dimensional inorganic nanostructures into functional 2D and 3D architectures. Synthesis, arrangement and functionality*. Chemical Society Reviews, 2012. 41(15): p. 5285-5312.

Jung et al., *Controlled porous structures of graphene aerogels and their effect on supercapacitor performance*. Nanoscale, 2015. 7(10): p. 4386-4393.

Ke et al., *Graphene-based materials for supercapacitor electrodes*. Journal of Materiomics, 2016. 2(1): p. 37-54.

Kumar et al., *Graphene and molybdenum disulfide hybrids: synthesis and applications*. Materials Today, 2015. 18(5): p. 286-298.

Lehtimaki et al., *Preparation of Supercapacitors on Flexible Substrates with Electrodeposited PEDOT/Graphene Composites*. Acs Applied Materials & Interfaces, 2015. 7(40): p. 22137-22147.

Li et al., *Flexible graphene/MnO2 composite papers for supercapacitor electrodes*. Journal of Materials Chemistry, 2011. 21(38): p. 14706-14711.

Li et al., *Compressed porous graphene particles for use as supercapacitor electrodes with excellent volumetric performance*. Nanoscale, 2015. 7(44): p. 18459-18463.

Liang et al., *High-Efficiency and Room-Temperature Reduction of Graphene Oxide: A Facile Green Approach Towards Flexible Graphene Films*. Small, 2012. 8(8): p. 1180-1184.

Liu et al., *Folded structured graphene paper for high performance electrode materials*. Adv Mater, 2012. 24(8): p. 1089-94.

Liu et al., *Flexible and conductive nanocomposite electrode based on graphene sheets and cotton cloth for supercapacitor*. Journal of Materials Chemistry, 2012. 22(33): p. 17245-17253.

Liu et al., *Nanostructured Graphene Composite Papers for Highly Flexible and Foldable Supercapacitors*. Advanced Materials, 2014. 26(28): p. 4855-+.

Liu et al., *High-Performance Flexible All-Solid-State Supercapacitor from Large Free-Standing Graphene-PEDOT/PSS Films*. Scientific Reports, 2015. 5.

Liu et al., *Advanced Li-Ion Hybrid Supercapacitors Based on 3D Graphene-Foam Composites*. Acs Applied Materials & Interfaces, 2016. 8(39): p. 25941-25953.

Mao et al., *Simultaneous electrochemical synthesis of few-layer graphene flakes on both electrodes in protic ionic liquids*. Chemical Communications, 2013. 49(46): p. 5301-5303.

Moon et al., *Reduced graphene oxide by chemical graphitization*. Nat Commun, 2010. 1: p. 73.

Moon et al., *Lateral photovoltaic effect in flexible free-standing reduced graphene oxide film for self-powered position-sensitive detection*(vol. 6, 33525, 2016). Scientific Reports, 2016. 6.

Niu et al., *A Leavening Strategy to Prepare Reduced Graphene Oxide Foams*. Advanced Materials, 2012. 24(30): p. 4144-4150.

Patil et al., *Graphene oxide and functionalized multi walled carbon nanotubes as epoxy curing agents: a novel synthetic approach to nanocomposites containing active nanostructured fillers*. Rsc Advances, 2014. 4(90): p. 49264-49272.

Pham et al., *Reduced Graphene Oxide Hydrogels Deposited in Nickel Foam for Supercapacitor Applications: Toward High Volumetric Capacitance*. Journal of Physical Chemistry C, 2016. 120(10): p. 5353-5360.

Ping et al., *Preparation of three-dimensional graphene foam for high performance supercapacitors*. Progress in Natural Science-Materials International, 2017. 27(2): p. 177-181.

Sadak et al., *Highly selective colorimetric and electrochemical sensing of iron (III) using Nile red functionalized graphene film*. Biosens Bioelectron, 2017. 89(Pt 1): p. 430-436.

Shao et al., *3D Freeze-Casting of Cellular Graphene Films for Ultrahigh-Power-Density Supercapacitors*. Advanced Materials, 2016. 28(31): p. 6719-+.

Strong et al., *Patterning and Electronic Tuning of Laser Scribed Graphene for Flexible All-Carbon Devices*. Acs Nano, 2012. 6(2): p. 1395-1403.

Tsang et al., *The use of graphene based materials for fuel cell, photovoltaics, and supercapacitor electrode materials*. Solid State Sciences, 2017. 67: p. A1-A14.

Vedhanarayanan et al., *Exfoliation of Reduced Graphene Oxide with Self-Assembled pi-Gelators for Improved Electrochemical Performance*. ACS Appl Mater Interfaces, 2017. 9(23): p. 19417-19426.

Wang et al., *Facile, mild and fast thermal-decomposition reduction of graphene oxide in air and its application in high-performance lithium batteries*. Chemical Communications, 2012. 48(7): p. 976-978.

Wang et al., *Functional Three-Dimensional Graphene/Polymer Composites*. Acs Nano, 2016. 10(8): p. 7231-7247.

Weiss et al., *Graphene: an emerging electronic material*. Adv Mater, 2012. 24(43): p. 5782-825.

Yasri et al., *Azo dye functionalized graphene nanoplatelets for selective detection of bisphenol A and hydrogen peroxide*. Rsc Advances, 2015. 5(106): p. 87295-87305.

Zhang et al., *Controlled synthesis of few-layered graphene sheets on a large scale using chemical exfoliation*. Carbon, 2010. 48(8): p. 2367-2371.

Zhang et al., *Facile Synthesis of 3D MnO2-Graphene and Carbon Nanotube-Graphene Composite Networks for High-Performance, Flexible, All-Solid-State Asymmetric Supercapacitors*. Advanced Energy Materials, 2014. 4(10).

Zhao et al., *Flexible Holey Graphene Paper Electrodes with Enhanced Rate Capability for Energy Storage Applications*. Acs Nano, 2011. 5(11): p. 8739-8749.

Zhao et al., *MnO2/graphene/nickel foam composite as high performance supercapacitor electrode via a facile electrochemical deposition strategy*. Materials Letters, 2012. 76: p. 127-130.

Zhu et al., *Graphene and graphene oxide: synthesis, properties, and applications*. Adv Mater, 2010. 22(35): p. 3906-24.

\* cited by examiner

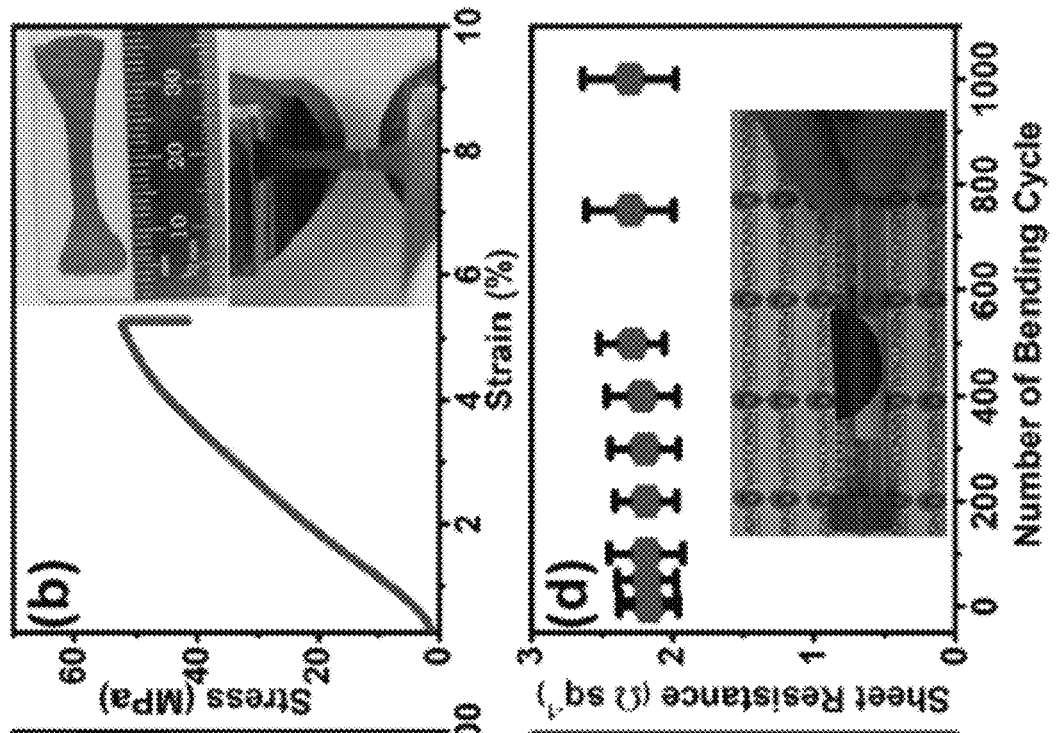
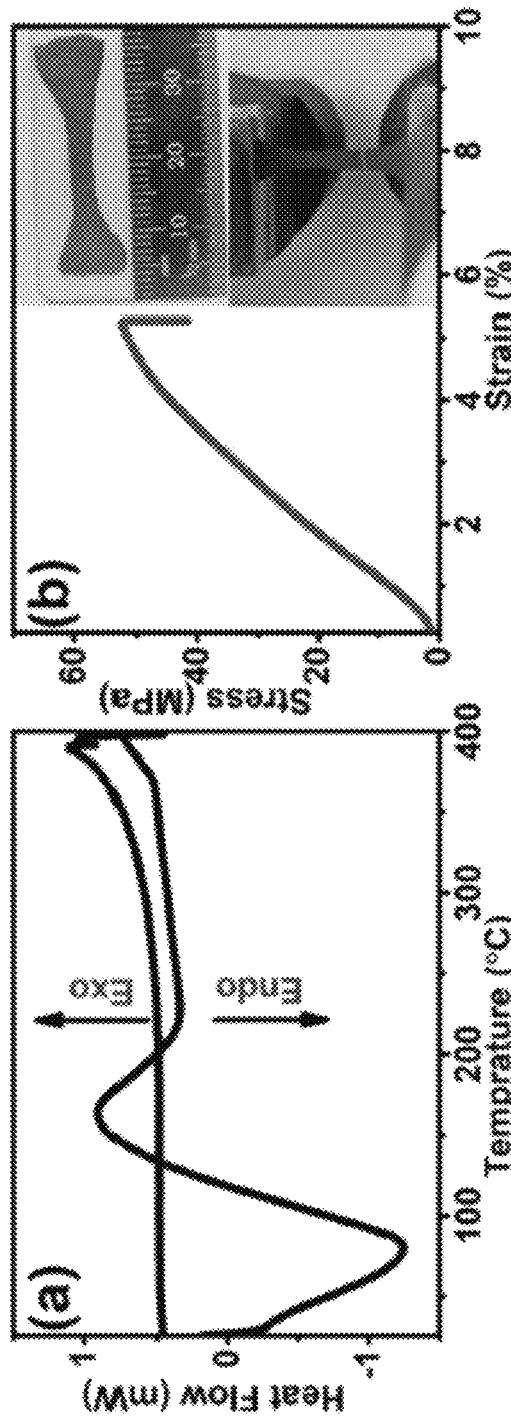
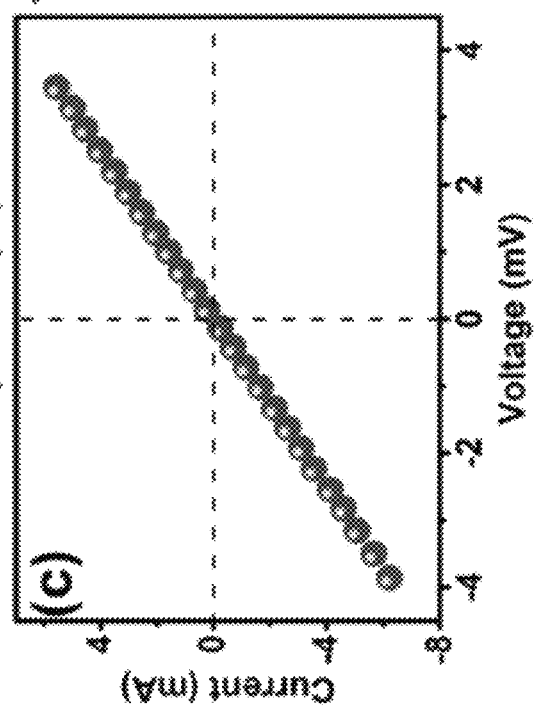
FIG. 3A  FIG. 3B  FIG. 3C  FIG. 3D

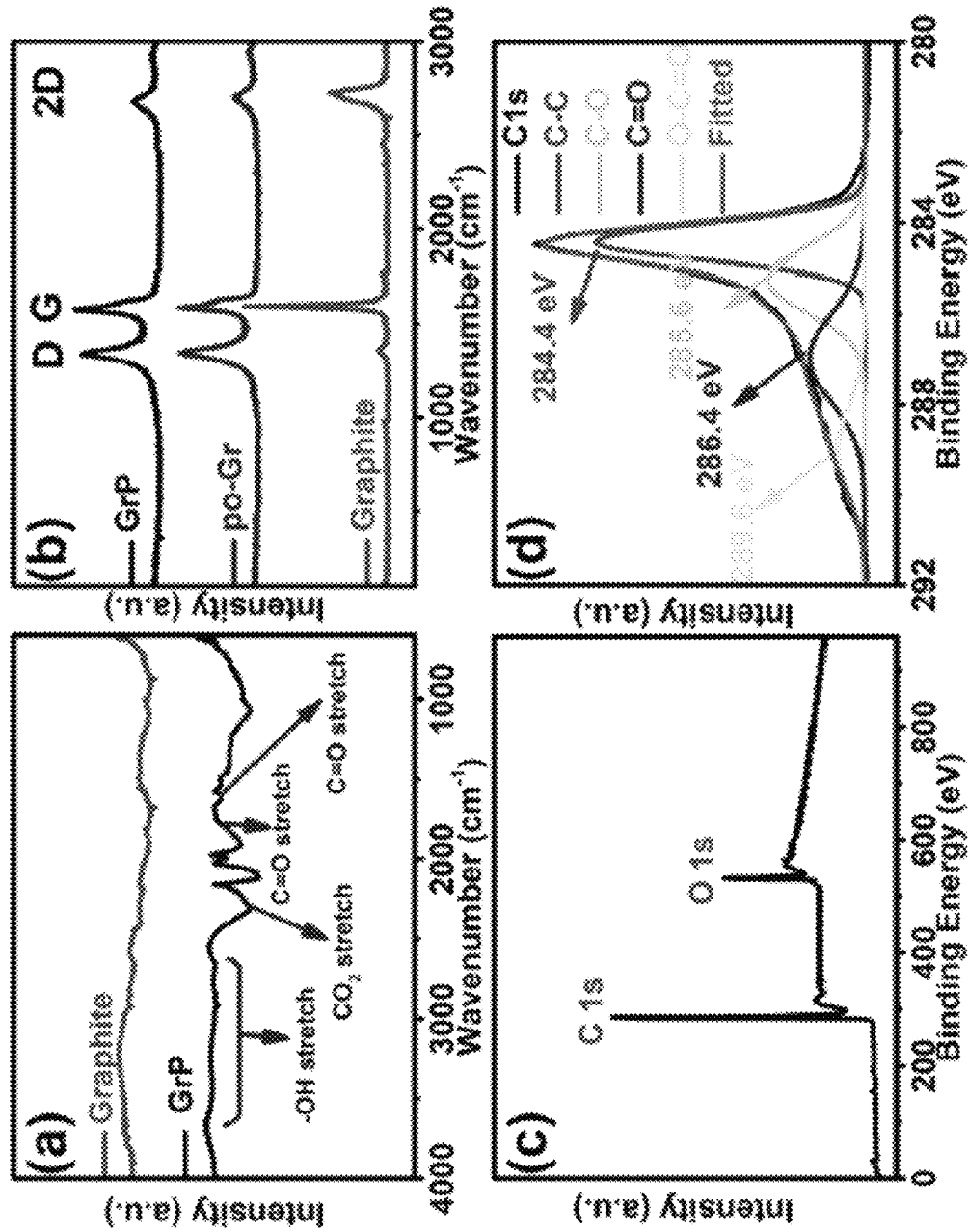

FIG. 5A
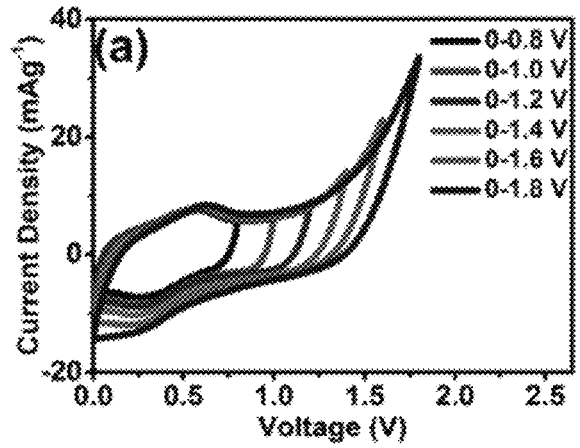
FIG. 5B
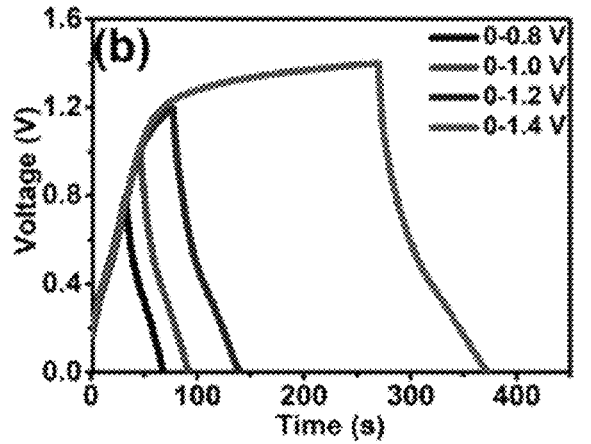
FIG. 5C (middle)
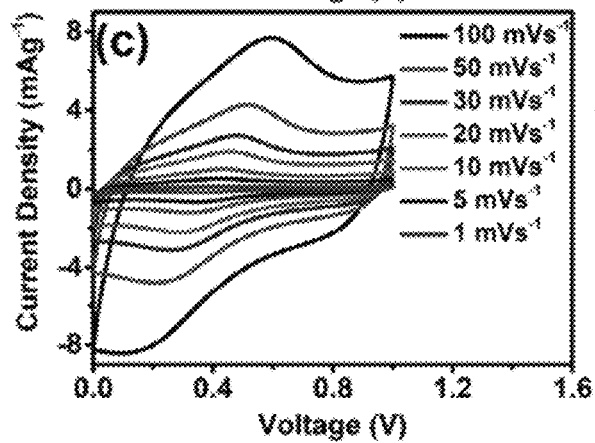
FIG. 5D (middle)
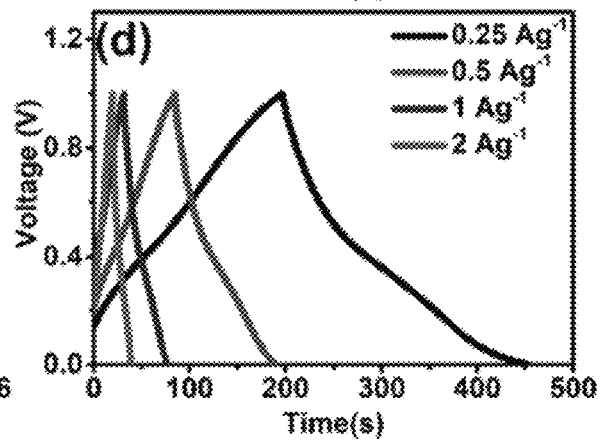
FIG. 5E (bottom)
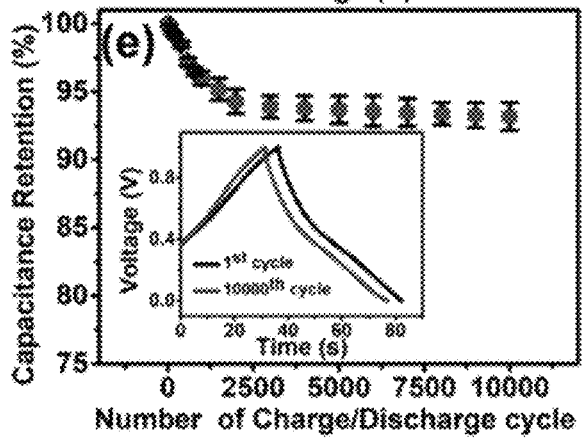
FIG. 5F (bottom)
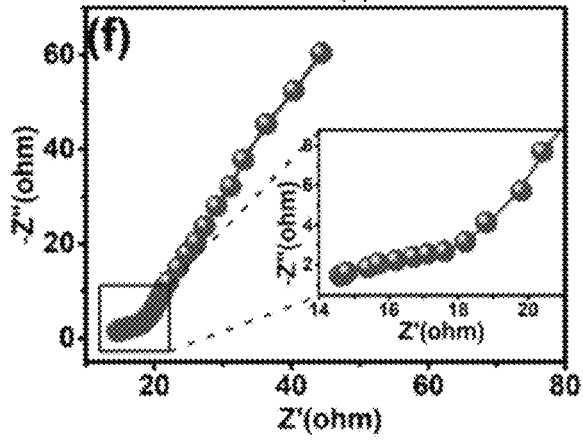

METHOD TO MAKE FLEXIBLE, FREE-STANDING GRAPHENE PAPER AND PRODUCT FORMED THEREBY

CROSS-REFERENCE TO RELATED APPLICATIONS

Priority is hereby claimed to provisional application Ser. No. 62/579,369, filed Oct. 31, 2017, which is incorporated herein by reference.

FEDERAL FUNDING STATEMENT

This invention was made with government support under 18-CRHF-0-6055 awarded by the USDA/NIFA. The government has certain rights in the invention.

BACKGROUND

Graphene, a single layer of carbon atoms in a honeycomb lattice, has attracted extensive investigations owing to its exceptional properties such as high thermal conductivity (~5000 W m$^{-1}$ K$^{-1}$), large theoretical specific surface area (2630 m$^2$ g$^{-1}$), high carrier concentration (up to 10$^{13}$ cm$^{-2}$), mobility (over 10$^4$ cm$^2$V$^{-1}$ s$^{-1}$), and high Young's modulus (~1 TPa), etc.[1-5] In addition, its lightweight, high electrical conductivity, strong mechanical strength, and chemical stability make graphene a promising candidate for electrode materials such as flexible and wearable electronics and energy-related devices. [6-9] Moreover, graphene can be easily integrated into freestanding and flexible three-dimensional (3D) graphene paper [10, 11], foam [12, 13], or film [14, 15] structures using various methods, including vacuum filtration [16], lyophilization[17], mechanical compression of graphene hydrogels [18, 19] or aerogels [20, 21], and simply drying on flexible substrates.[22, 23] 3D porous graphene structures are suitable platforms to fabricate flexible electrodes, as well as energy conversion and storage devices such as solar cells, supercapacitors, and lithium ion batteries.[24-26]

However, cost-effective and environmentally friendly methods to fabricate graphene-based materials are required to ease large-scale manufacturing of graphene and broaden its applications.[27, 28] Graphene can be prepared from graphite in many ways, including mechanical cleavage [29], chemical exfoliation [30], thermal decomposition [31], and electrochemical exfoliation.[32, 33] See also U.S. Pat. No. 9,147,881 to Lee et al., issued Sep. 29, 2015. Among these, electrochemical exfoliation without the use of toxic or corrosive oxidation and/or reducing agents is a simple, rapid method to produce graphene flakes.[33, 34] Electrochemical exfoliation is conventionally seen as a "green" (i.e., environmentally friendly) route to making graphene flakes.

Several specific methods of fabricating graphene paper are described in the U.S. and foreign patent literature. For example, Korean Patent Application No. 10-2007-0126947 describes a method of preparing a reduced graphene oxide thin layer. The method includes forming a graphene oxide layer by coating a graphene oxide dispersion onto a substrate. The graphene oxide layer is then reduced by immersing the substrate with its graphene oxide coating into a reducing agent-containing solution. The reduced graphene oxide is then doped with an organic or inorganic dopant.

U.S. Pat. No. 9,776,378 describes graphene sheets that have an intercalating compound between the graphene sheets. The intercalator is ostensible to control the electrical, optical, and/or physical properties of the graphene sheets See also U.S. Pat. No. 8,227,685.

Korean Patent Application No. 10-2009-0054708 describes a method of making graphene paper via spin drying graphene oxide dispersed in a hydrophilic solution and then reducing the graphene oxide film so formed.

U.S. Pat. Appl. Ser. No. 2013/0001089 describes a method of making graphene sheet by immersing a pair of carbon-containing electrodes in an electrolyte containing an acid, an anionic surfactant, a salt, and an oxidizing agent and passing an electrical current through the electrodes. Graphene exfoliated from the electrodes is recovered from the electrolyte solution.

There remains, however, a long-felt an unmet need for an efficient, cost-effective, and environmentally low-impact route to making a free-standing, flexible, and highly conductive electrochemically exfoliated graphene paper.

SUMMARY

Disclosed herein is a method of making free-standing graphene sheets. The method comprises passing an electric potential between a graphite-containing anode and a graphite-containing cathode disposed in a buffered aqueous electrolyte. This is done at a voltage and amperage wherein partially oxidized graphene is exfoliated from the anode and/or the cathode into the electrolyte. The partially oxidized graphene is then separated from the electrolyte and re-dispersed in water or an aqueous solution to yield a dispersion. This can be done by any suitable separation mechanism, such as filtration. The dispersion is then acidified to yield partially oxidized graphene sheets dispersed in an acidified dispersion. The partially oxidized graphene sheets are then separated from the acidified dispersion. Here, the partially oxidized graphene sheets accumulate as the retentate, typically as a filter cake on the chosen filter used. The partially oxidized graphene sheets are then dried to yield free-standing graphene sheets having a carbon-to-oxygen ratio of at least about 8.0.

The potential passed between the anode and cathode to exfoliate the partially oxidized graphene is preferably between about ±3.0 V to about ±100 V (that is, about +3.0 V to about +100 V or about −3.0 V to about −100 V), and more preferably about ±10 V. The voltage may be constant or varied.

The electrolyte solution used is preferably selected from phosphate-buffered saline, borate-buffered saline, Tris-buffered saline, Tris/Acetic Acid/EDTA buffer and Tris/Borate/EDTA buffer, although other buffers may be used. (A huge number of buffer systems are known in the chemical and electrochemical arts.) The pH of the electrolyte solution is preferably near to neutral, roughly about pH 6.5 and about pH 7.5 and at a concentration of from about 0.05 M to about 1.0 M. In the most preferred approach, the buffered aqueous electrolyte has a pH of about 7.0.

Upon re-dispersing the exfoliated, partially oxidized graphene, the dispersion is acidified to a pH of about 4.0 or lower, more preferably about pH 3.5 or lower. Acidification can be accomplished using any suitably strong acid, preferably a mineral acid such as HCl, HNO$_3$, H$_3$PO$_4$, H$_2$SO$_4$, H$_3$BO$_3$, HF, HBr, HClO$_4$, HI, and the like. Organic acids may also be used, for example: formic acid, acetic acid, citric acid, maleic acid, methanesulfonic acid, salicylic acid, and the like. Acidifying the solution causes partially oxidized graphene sheets to form that can be separated from the dispersing solvent via filtration. The partially oxidized graphene accumulates as a filter cake on the filter. The filter cake is then dried (preferably air-dried, although it may also be dried in a furnace at elevated temperature). Once dried, the result is a free-standing graphene paper that can simply be peeled from the filter. Typically, a filter medium (such as filter paper) having a nominal pore size of 0.2 μm or smaller is used for filtering the acidified dispersion.

The method yields a free-standing graphene paper having a carbon-to-oxygen ratio of at least about 8.0, more preferably at least about 8.5, and still more preferably at least about 8.6.

Also disclosed herein is the free-standing graphene sheet having a carbon-to-oxygen ratio of at least about 8.0 formed by the method disclosed herein.

BRIEF DESCRIPTION OF THE DRAWINGS

FIGS. 3A, 3B, 3C, and 3D are graphs showing various electronic and physical characteristics of the graphene paper disclosed herein. FIG. 3A presents differential scanning calorimetry (DSC) curves of graphene paper prepared as disclosed herein. FIG. 3B is a tensile stress-strain curve with 0.09-mm thick graphene paper sample; insets: specimen before the stress-strain testing (top inset) and specimen after the stress-strain testing (bottom inset). FIG. 3C is an I-V curve (i.e., a current-voltage curve) of graphene paper prepared according to the present method. FIG. 3D is a graph showing sheet resistance as a function of number of bending cycles (inset: photograph of the graphene paper during the bending test).

FIGS. 4A, 4B, 4C and 4D are various spectra of the graphene paper disclosed herein. FIG. 4A shows the FT-IR spectrum of the graphene paper (black trace) superimposed with the corresponding spectrum for pristine graphite (red trace). FIG. 4B shows Raman spectra of the graphene paper, partially-oxidized graphene, and pristine graphite. FIG. 4C shows the X-ray photoelectron (XPS) spectrum for the graphene paper. FIG. 4D is a high-resolution XPS spectrum for C is (black trace) and various bond types (C—C, C—O, C=O, and O—C=O).

FIGS. 5A, 5B, 5C, 5D, 5E, and 5F are a series of different cyclic voltammetry and galvanostatic plots for the graphene paper disclosed herein. FIG. 5A is a cyclic voltammogram of graphene paper at different potential windows in 1 M $H_2SO_4$. FIG. 5B is a cyclic voltammetry of the graphene paper at different scan rates in 1 M $H_2SO_4$ at 1, 5, 10, 20, 30, 50 and 100 mV. FIG. 5C is a galvanostatic charge-discharge curves of the graphene paper at a constant current density of 1 A/g in 1 M $H_2SO_4$. Galvanostatic charge-discharge curves of graphene paper at different current density in 1 M $H_2SO_4$. FIG. 5D is a galvanostatic charge-discharge curves of the graphene paper at different current densities. FIG. 5E depicts cycle life of the graphene paper at a constant current density of 4 A/g (inset is the corresponding charge/discharge curve). FIG. 5F depicts Nyquist plots of the graphene paper in 0.1 M KCl solution containing 5 mM $[Fe(CN)_6]^{3-/4-}$ at a frequency range from 0.1 to 100,000 Hz (the inset is the enlarged figure at the high frequency).

FIG. 6A shows the graphene paper deposited on filter paper before drying. FIG. 6B shows the graphene paper on the filter paper after drying. FIG. 6C shows that the dried graphene paper can be easily separated from the underlying filter paper using a tweezers. FIG. 6D shows the dimensions of the graphene paper made in this example. It is roughly 30 mm in diameter. FIG. 6E demonstrates the flexibility of the resulting graphene paper; it can be folded onto itself without breaking. FIG. 6F shows that the resulting graphene paper can be rolled into a cone or funnel.

DETAILED DESCRIPTION

Figure 1:
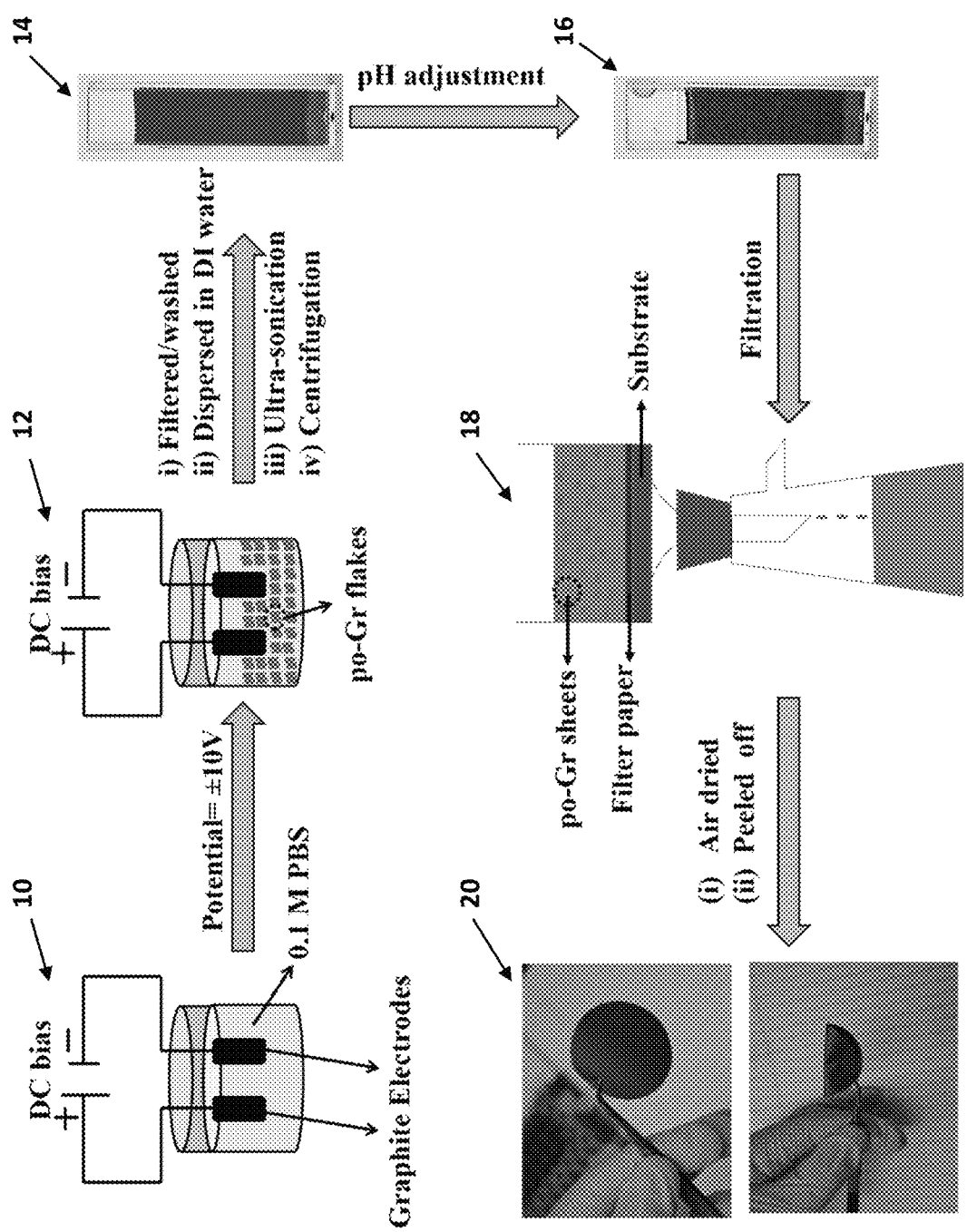
FIG. 1 is a schematic flow chart depicting the method of preparing flexible, free-standing graphene paper via vacuum filtration, as disclosed herein.

Definitions:

"Free-standing," when referring to graphene, means a single atomic plane of graphite [i.e. graphene], which is sufficiently isolated from its environment to be a self-contained molecule. "Free-standing" graphene is not deposited on a surface or support layer. See, for example, Geim, A. (2009) "Graphene: Status and Prospects," *Science*. 324 (5934):1530-4.

"Graphene" refers to a 2-dimensional (2D) crystalline allotrope of carbon having a single atomic plane of carbon atoms. The carbon atoms of graphene are densely packed in a planar, regular, atomic-scale hexagonal pattern in which the valence electrons of each carbon atom are $sp^2$ hybridized.

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 1 to 9, from 3.6 to 4.6, from 3.5 to 9.9, and so forth.

All references to singular characteristics or limitations of the present invention shall include the corresponding plural characteristic or limitation, and vice-versa, unless otherwise specified or clearly implied to the contrary by the context in which the reference is made. The indefinite articles "a" and "an" mean "one or more."

All combinations of method or process steps as used herein can be performed in any order, unless otherwise specified or clearly implied to the contrary by the context in which the referenced combination is made.

The method disclosed herein can comprise, consist of, or consist essentially of the essential elements and limitations of the method described, as well as any additional or optional ingredients, components, or limitations described herein or otherwise useful in synthetic organic chemistry and/or electrochemistry.

The Method:

Disclosed herein is a method to make free-standing graphene paper by fabricating partially oxidized graphene via electrochemical exfoliation of graphite and then vacuum-filtering and air-drying the partially oxidized graphene to yield free-standing graphene. The method is illustrated schematically in FIG. 1. The thickness of graphene paper can be controlled by adjusting the volume and the concentration of the partially oxidized graphene suspension. The graphene paper so formed can be cut into any desired shape with a conventional scissors or knife. The as-fabricated graphene paper exhibits high performance when it is used an electrode material in supercapacitors, lithium-ion battery or solar cell applications, and the like, as compared to carbon-based materials. The method is highly useful because it is flexible, simple, has a very low environmental impact, and is scalable for mass production purposes.

The method is best disclosed by way of an illustrative fabrication run.

In a first step, as illustrated in FIG. 1 at panels 10 and 12, partially oxidized graphene is formed in solution via electrochemical exfoliation of graphite. Graphite sheets were used as the anode and cathode electrodes and 0.1 M phosphate-buffered saline (PBS) solution (pH 7.0) was used as the supporting electrolyte. (Graphite sheets are available from a host of commercial suppliers, such as GraphiteStore.com, Northbrook, Ill. The electrolyte may be any buffered, aqueous solution whose pH is between about pH 6.5 and pH 7.4 PBS is preferred. Conventional PBS recipes vary slightly, but a typical stock solution contains NaCl (137 mmol/L; 8 g/L), KCl (2.7 mmol/L; 0.2 g/L), $Na_2HPO_4$ (10 mmol/L; 1.42 g/L) and $KH_2PO_4$ (1.8 mmol/L; 0.24 g/L). The stock solution can then be diluted to any desired concentration. The run described here used a 0.1 M solution of PBS. The concentration may range from about 0.05 M to about 1.0 M of the buffered electrolyte. Other buffered electrolytes may also be used, such as borate-buffered saline (~10 mM sodium borate and ~50 mM NaCl), Tris-buffered saline (~50 mM tris(hydroxymethyl)aminomethane ("Tris") and ~150 mM NaCl), Tris/Acetic Acid/EDTA ("TAE") buffer (~40 mM Tris, ~20 mM acetic acid, and 1 mM EDTA), Tris/Borate/EDTA ("TBE") buffer (1 L of 5× stock solution contains 54 g Tris, 27.5 g of boric acid, and 20 ml of 0.5 M EDTA), and the like.

Applying a voltage across the electrodes for 30 min results in partially oxidized graphene flakes being exfoliated from the graphite electrodes. In this particular test run, ±10.0 V was applied. The voltage can be constant or varied and range between roughly about ±3.0 V to ±100.0 V. This causes graphene flakes to be exfoliated from the surface of the electrodes. The resulting flakes were filtered and washed with deionized (DI) water several times using vacuum filtration. Any suitable filtration medium (paper, pad, etc.) may be used. A host of filter media are available commercially; see, for example, Fisher Scientific, Pittsburgh, Pa., GE Healthcare Whatman, Chicago, Ill. Here, mixed cellulose filter paper with a nominal pore size of 0.2 μm was used to remove PBS and any other by-products or contaminants in the electrolyte solution. The partially oxidized graphene collects on the filter paper. The resulting intermediate was then dispersed in DI water via ultra-sonication with a probe-sonicator for 60 min to obtain a partially oxidized graphene dispersion in water. The dispersion was centrifuged at 3000 rpm for 30 min and supernatant was collected. The concentration of the supernatant was adjusted to be about 1 mg/mL graphene. The resulting dispersion is shown in FIG. 1, reference 14.

To prepare the graphene paper, a 3 mL aliquot of the partially oxidized graphene (1 mg $mL^{-1}$) dispersion was diluted with 50 mL DI water and pH was adjusted to be 3.5 using 1 M $H_2SO_4$. This acidification step yields the dispersion shown in FIG. 1, reference 16. Thereafter, the dispersion was filtered using mixed cellulose filter paper with a pore size of 0.2 μm. See FIG. 1, panel 18. The graphene paper collects on the filter paper. After drying at room temperature for 6 h, the resulting graphene paper was peeled off the filter paper as shown in FIG. 1, reference 20.

Characterization of the Resulting Graphene Paper:

An electrochemical workstation (model 660D, CH Instruments, Austin, Tex.) was used for electrochemical measurements. A three-electrode system was employed to investigate the supercapacitance performance of the as-prepared electrode with platinum wire as the counter electrode, and Ag/AgCl (1 M KCl) as the reference electrode. Cyclic voltammetry (CV) and galvanostatic charge/discharge measurements were recorded in 0.1 M $H_2SO_4$ as an electrolyte. Electrochemical impedance spectroscopy (EIS) was performed in 0.1 M KCl containing 5 mM $[Fe(CN)_6]^{3-/4-}$ at room temperature. The first cycle of the CV measurements was always discarded. The partially oxidized graphene dispersion was produced by using a Tektronix PS280 DC power supply (Tektronix, Inc., Tulsa, Okla.) in 0.1 M PBS (pH 7.0) as an electrolyte. UV-Vis (Lambda 25 model, Perkin Elmer, Inc. Waltham, Mass.), Fourier transform infrared (FT-IR) (Spectrum 100, Perkin Elmer), Raman (LabRAM Aramis Horiba Jobin Yvon Confocal Raman Microscope; Horiba Ltd., Minami-ku, Kyoto, Japan) (wavelength: 532 nm) X-ray photoelectron (XPS) (Thermo Scientific, K-Alpha model; ThermoFisher Scientific, Waltham, Mass.) spectroscopies were employed to characterize the as-prepared samples. The surface morphology of the samples was investigated using a field emission scanning electron microscope (FE-SEM) (LEO1530, Gemini FE-SEM, Carl Zeiss) (Carl Zeiss AG, Oberkochen, Germany) was used at 3 kV and at 3 mm working distance. A host of different types of graphene were tested, including graphene paper formed according to the method disclosed herein. The results are presented in Table 1.

TABLE 1

Properties of synthesized GrP with those of previously reported graphene materials.

| Graphene Materials | Synthesis Method | Sheet Resistance (Ω/sq) | Thickness (μM) | Specific Capacitance (F/g) | Reference |
|---|---|---|---|---|---|
| Graphene Paper | Filter/vacuum dry | N/A[c] | 102 | 147 | Wang et al. *ACS Nano* 3 (7) (2009) 1745e1752. |

TABLE 1-continued

Properties of synthesized GrP with those of previously reported graphene materials.

| Graphene Materials | Synthesis Method | Sheet Resistance ($\Omega$/sq) | Thickness ($\mu M$) | Specific Capacitance (F/g) | Reference |
|---|---|---|---|---|---|
| Graphene Paper | Filter/dry | N/A | N/A | 120 | Weng et al. *Adv. Energy Mater.* 1 (5) (2011) 917e922. |
| rGO[a] foam | Filter/dry | 100 | N/A | 110 | Niu et al. *Adv. Mater.* 24 (30) (2012) 4144e4150. |
| rGO | Filter/dry | 21-23 | 104 | N/A | Moon et al., *Sci. Rep.-UK* 6, 33525 (2016). |
| Graphene Paper | Mechanical pressing of GO[b] aerogel | N/A | 10 | 111 | Liu et al. *Adv. Mater.* 24 (8) (2012) 1089e1094. |
| rGO film | Brush coat/anneal | 225 | N/A | 8107 | Liu et al. *J. Mater. Chem.* 22 (33) (2012) 17245e17253. |
| rGO powder | Chemical graphitization | 19.6 | 605 | N/A | Moon et al. *Nat. Commun.* 1 (2010) 73. |
| rGO film | Gas-phase reduction of GO | 8.5 | 605 | N/A | Liang et al. *Small* 8 (8) (2012) 1180e1184. |
| Functionalized Graphite | Solution casting | 60 | N/A | N/A | Jeon et al. *Chem. Mater.* 23 (17) (2011) 3987e3992. |
| rGO film | Oven dry | 15 | 30 | 180 | Cong et al., *Energy Environ. Sci.* 6 (4) (2013) 1185e1191. |
| rGO paper | Filter/thermal reduction | 10-16 | 5 | N/A | Zhao et al., *ACS Nano* 5 (11) (2011) 8739e8749. |
| GrP | Electrochemical exfoliation and vacuum filtration | 2.2 | 12 | 195.8 | This work |

[a]rGO: reduced graphene oxide.
[b]GO: graphene oxide.
[c]N/A: not applicable.

Figure 2:
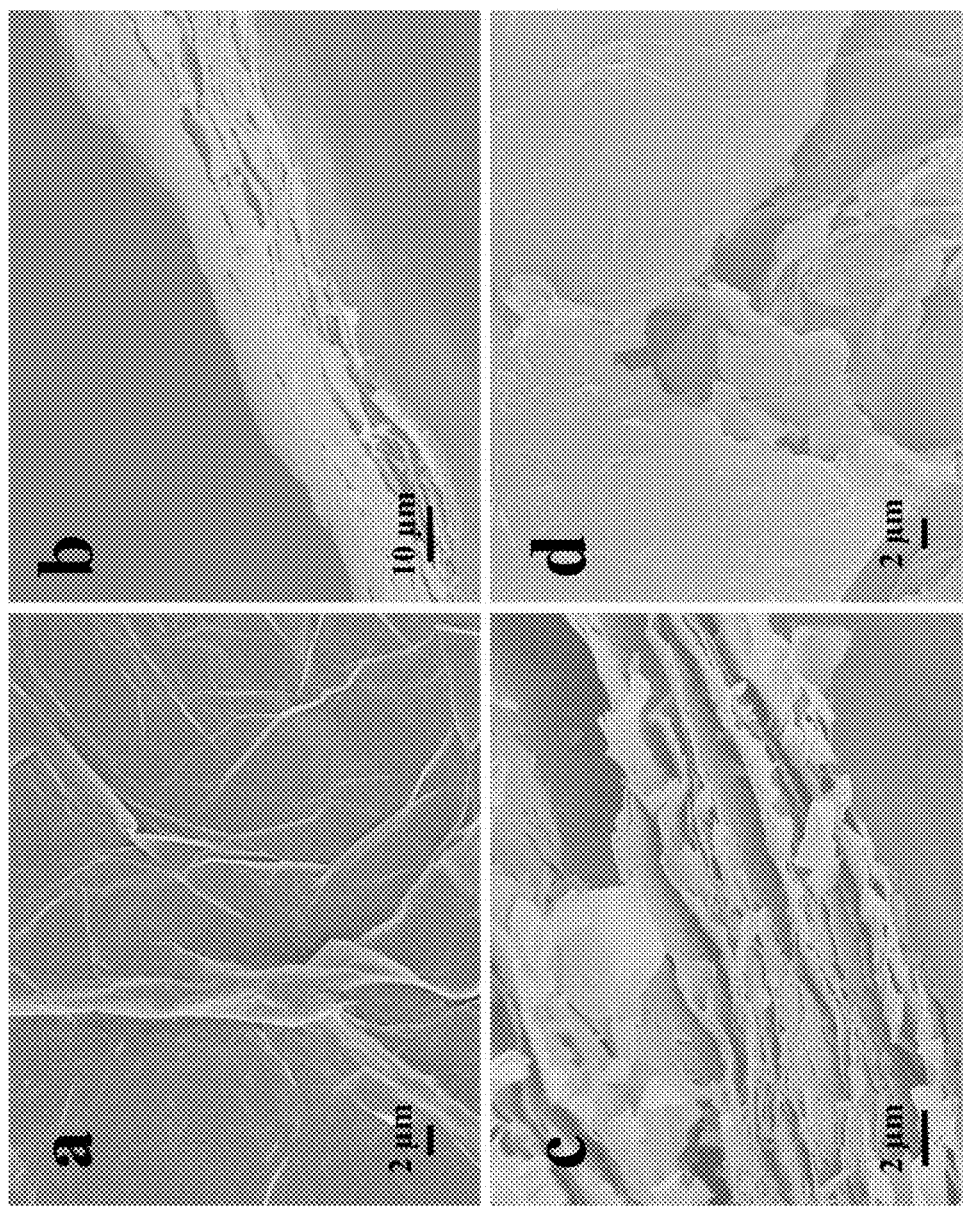
FIG. 2 is a series of scanning electron microscopy images of the graphene paper formed by the disclosed method. Panel (a) is an image of the graphene paper at room temperature. Panel (b) is a cross-sectional view of the graphene paper at low magnification. Panel (c) is a cross-sectional view of the graphene paper at high magnification. Panel (d) is an image of the graphene paper after being heat-treated at 400° C.).

The morphology of the graphene paper made according to the present method and the corresponding cross-sectional analysis were investigated by scanning electron microscope (SEM). FIG. 2, panel (a) is a top plan view SEM image of the subject graphene paper which reveals typical wrinkled and curved features for that are characteristic of graphene sheets. The edges of the graphene paper display a uniform and well-stacked 2D layer-by-layer hierarchy as shown in the cross-section SEM images shown in FIG. 2, panels (b) and (c). The layers depicted had a 12 µm thickness. FIG. 2, panel (b) is at a lower magnification, while FIG. 2, panel (c) is at a higher magnification. This uniform 2D structure of the subject graphene paper is particularly beneficial for electrode materials due to a highly reachable surface area for ion and electron diffusion. This accessibility lowers the charge transfer resistance and increases the capacitance of the electrode. The surface morphology of the graphene paper after heat treatment was also studied. After heat-treating the graphene paper at 400° C. for 3 h, in addition to the characteristic wrinkled and curved features, the graphene sheets exhibited very sharp edges, as seen in FIG. 2, panel (d). These sharpened edges are due to the elimination of water entrapped between the graphene sheets.

To confirm the presence of entrapped water, differential scanning calorimetry (DSC) was performed with two distinct heating and cooling cycles in the range of 25 and 400° C. See FIG. 3A. In the first heating cycle for the graphene paper, an irreversible endothermic peak is observed between 78 and 133° C., which is ascribed to vaporization of residual water between the graphene sheets. Moreover, an irreversible exothermic peak in the first heating cycle was also observed at 165° C., which is attributed to defunctionalization of the graphene sheets [35]. The endothermic and exothermic peaks are no longer observed in the subsequent cooling and heating cycle.

To demonstrate its mechanical stability and flexibility, the free-standing and lightweight (~0.2 mg cm$^{-2}$) graphene paper was manually bent 1000 times with an average bending radius of 10 mm without any damage. A four-point probe (Cascade Microtech Inc., Beaverton, Oreg.) was used to acquire an I-V curve (shown in FIG. 3C) and to measure the sheet resistivity (shown in FIG. 3D). The I-V test results are depicted in FIG. 3C. As shown in the figure, the graphene paper exhibited a highly linear I-V curve which indicates ohmic behavior. A linear I-V curve is a characteristic of conductors. The sheet resistivity and electrical conductivity were calculated to be around 2.17 $\Omega$sq$^{-1}$ and 3.85×10$^5$ S m$^{-1}$, respectively. As shown in FIG. 3D, the free-standing and conductive graphene paper exhibited no changes in sheet resistivity (~2.17 $\Omega$sq$^{-1}$) even after 1,000 consecutive bending cycles at 10 mm bending radius at room temperature. There was only 4% change in sheet resistivity over 1000 bending cycles. Thus, the fabricated graphene paper demonstrated excellent mechanical flexibility which is likely due to the intrinsic flexibility of individual, large-size graphene sheets that are formed by the method. FIG. 3B shows a tensile stress-strain curve using a 0.09-mm thick graphene paper sample. The upper inset shows the specimen before the stress-strain testing; the lower insert shows the specimen after the stress-strain testing.

The elemental characterization of as-prepared graphene paper was performed by FT-IR, Raman, and XPS spectra. FIG. 4A shows the FT-IR spectra of the graphene paper (black trace) and pristine graphite sheets (red trace). It is clearly seen that no significant peaks were observed for the pristine graphite sheets. In contrast, in the FT-IR spectrum of the graphene paper there are peaks at ~3430 cm$^{-1}$ (OH stretch), 2326 cm$^{-1}$ ($CO_2$ stretch), 1725 cm$^{-1}$ (C=O stretch), and 1642 cm$^{-1}$ (C=C stretch).

Raman spectroscopy is a common analytical technique for characterization of carbon based materials. The Raman spectra of the graphene paper as prepared by the present method, partially oxidized graphene paper, and pristine graphite sheet are shown in FIG. 4B. The spectrum for pristine graphite (black trace) shows a very small D band at 1361 cm$^{-1}$, which corresponds to the edge-induced disorder related to the presence of sp$^3$ defects. The spectrum for graphite also has a large G band around 1594 cm$^{-1}$ due to n-plane vibration of sp$^2$ hybridized carbon atoms and 2D band around 2729 cm$^{-1}$ which is associated with two phonon lattice vibrations. The partially oxidized graphene showed a large D band at 1343 cm$^{-1}$, a G band at 1587 cm$^{-1}$ and a 2D band at 2687 cm$^{-1}$. This is clear evidence of localized sp$^3$ defects in the sp$^2$ hybridized carbon atoms upon exfoliation and dispersion in water. After the pH adjustment of partially oxidized graphene dispersion to yield graphene, and the subsequent filtration, the D band downshifted from 1343 to 1340 cm$^{-1}$ and the G band from 1587 to 1575 cm$^{-1}$. The 2D band upshifted from 2680 to 2703 cm$^{-1}$. This is evidence showing that the graphene paper is comprised predominately of sp$^2$ hybridized carbon atoms.

In addition to the FT-IR and Raman spectra, XPS was used to analyze the structural composition of graphene paper. The wide XPS spectrum of the graphene paper is shown in FIG. 4C. It includes intense peaks at 286 and 530 eV corresponding to carbon (C1s) and oxygen (O1s), respectively. FIG. 4D presents the C1s spectra of the graphene paper. Here, there are peaks of 284.4 (C—C bonding), 285.6 (C—O bonding), 286.4 (C=O bonding) and 289.6 eV (O—C=O bonding). A dominant peak at 284.8 eV was attributed to sp$^a$ carbon, indicating that the amount oxidized carbon species is small. The C/O ratio was also calculated to be 8.68 in the graphene paper, proving the good quality of graphene sheet [36].

To investigate the electrochemical performances of the as-prepared graphene paper, a three-electrode system was used at room temperature in 1 M H$_2$SO$_4$ for the electrolyte, a Pt wire and the counter-electrode, and Ag/AgCl as the reference electrode. The graphene paper was attached to a poly(ethylene terephthalate) (PET) substrate as a support using two-sided carbon tape and then alligator clipped onto a copper foil to ensure good electrical contact. FIG. 5A shows the CV measurements in different potential windows with a fixed lower potential value (0 V) towards more positive potential values (up to 1.8 V) at 100 mV s$^{-1}$ to test electrochemical stability and performance of the graphene paper at different operating potentials. Usually, the large potential window indicates a high-power density. As shown by FIG. 4A, the potential window of the graphene paper can be extended to roughly 1.4 V without obvious polarization. Similarly, galvanotactic charge/discharge curves at different potential windows ranging from about 0.8 to about 1.4 at 1 A g$^{-1}$ are shown in FIG. 5B. Highly symmetrical curves up to about 1.2 V were obtained. This demonstrates that the graphene paper has high electrochemical reversibility.

FIG. 5C shows cyclic voltammetry (CV) curves of the as-prepared graphene paper at various scan rates from 1 to 100 mV s$^{-1}$ in the potential window from 0 V to 1.0 V. Here, the voltammogram exhibits rectangle-like shapes which are characteristic of good capacitive behavior. The specific capacitance of the graphene paper can be estimated from the CV curves of FIG. 5C by the following equation (1):

$$C_p = \frac{\int_{V_a}^{V_c} I(V)\,dV}{mv(V_a - V_c)} \quad (1)$$

where Cp is the specific capacitance (in F g$^{-1}$), m is the mass of active materials on the electrodes (g), v is the scan rate of CV curves (V/s) and ($V_a$-$V_c$) represents the potential window. The specific capacitance was found to be 195.8 F g$^{-1}$. The galvanostatic charge/discharge curves, were also performed in the potential range of 0-1.0 V at a current density of 0.25, 0.5, 1, and 2 A g$^{-1}$ to characterize the electrochemical properties of the as-synthesized graphene paper. See FIG. 5D. The figure exhibits equilateral triangle shapes, indicating high reversibility with a rapid I-V response with no IR drop.

The electrochemical stability of the graphene paper was also investigated using a galvanostatic charge/discharge test over 10,000 cycles at a current density of 4 A·g$^{-1}$. As shown in FIG. 5E, the capacitance retention of the graphene paper retained 93.2% of the capacitance after 10,000 consecutive cycles. The inset in FIG. 5E shows the charge/discharge current after 10,000 consecutive cycles.

The electrochemical properties of the graphene paper were further studied with electrochemical impedance spectroscopy (EIS). The impedance spectra were carried out in a solution of 0.1 M KCl containing 5 mM [Fe(CN)$_6$]$^{3-/4-}$ vs. Ag/AgCl over a frequency range of 0.1 Hz to 100 kHz at 0.318 V. FIG. 5F shows the Nyquist plots of the graphene paper. The plot exhibited a semicircle in the high frequency region and a straight line in the low frequency region. In the high frequency region, the low intercept at the x-axis corresponds to the low equivalent series resistance (ESR) ($R_s$=~15Ω). Also, the diameter of the semicircular arcs is responsible for the charge transfer resistance ($R_{ct}$) which was calculated to be 2.1Ω. At the low frequency region, a vertical shape implies an ideal electrochemical stability and good capacitance behavior for the graphene paper.

See Table 1, above, for a comparison of the graphene paper made according to the present method and versus graphene materials made by previously reported methods. As shown in Table 1, a graphene paper electrode made according to the present method has a much improved specific capacitance as compared to graphene made by earlier reported methods.

The present method is thus a straightforward, cost-effective, and environmentally friendly method to fabricate free-standing, flexible, and highly conductive graphene paper. The graphene paper formed by the method exhibits superior mechanical and electrochemical qualities. A 12 μm thick graphene paper made according to the method was mechanically and chemically stable and showed an ultra-low sheet resistivity of 2.17 Ωsq$^{-1}$ even after 1,000 consecutive bending cycles and a high electrical conductivity of 3.85×10$^5$ S m$^{-1}$. The graphene paper also exhibited an excellent capacitive performance, having a specific capacitance of 195.8 F g$^{-1}$ at 1 mV s$^{-1}$ in 0.1 M H$_2$SO$_4$ electrolyte. The graphene paper retained 93.2% capacitance after 10,000 consecutive cycles.

Figure 6A:
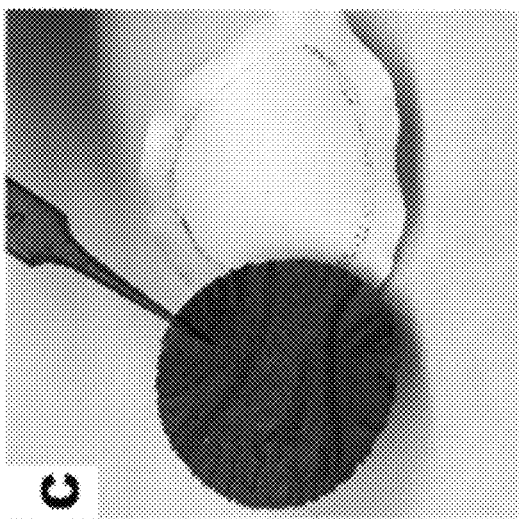
FIGS. 6A, 6B, 6C, 6D, 6E, and 6F are a series of digital images of graphene paper made according to the method disclosed herein.
Figure 6B:
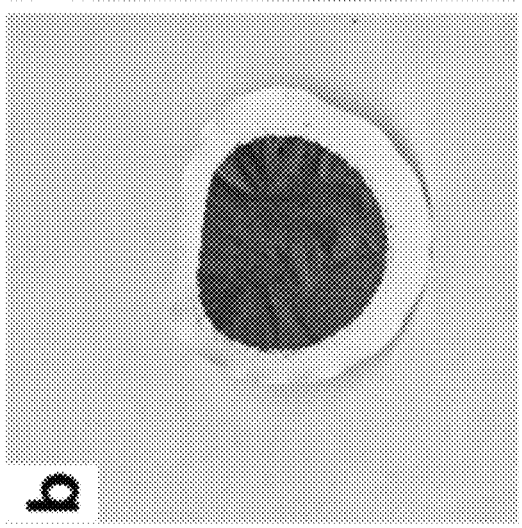
Figure 6C:
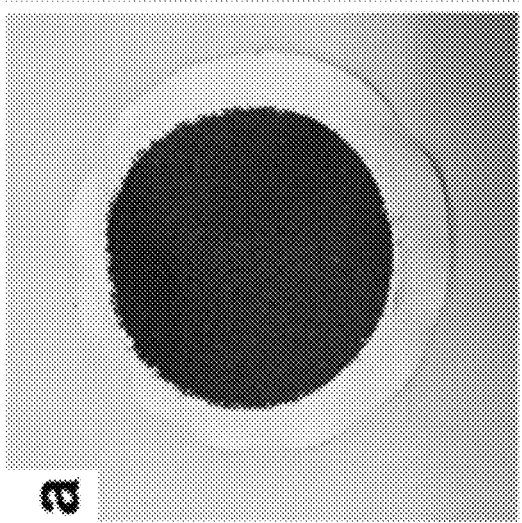
Figure 6D:
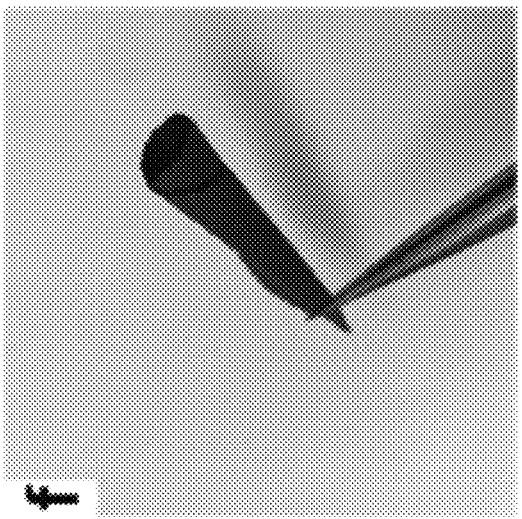
Figure 6E:
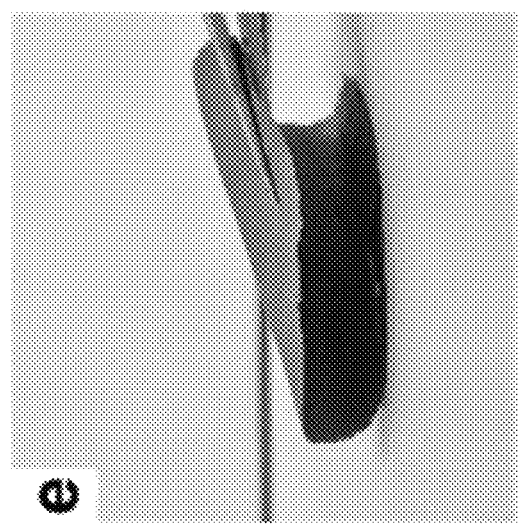
Figure 6F:
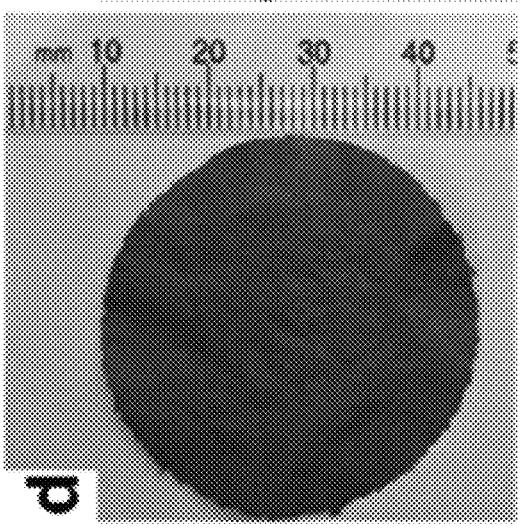
Figure 7A:
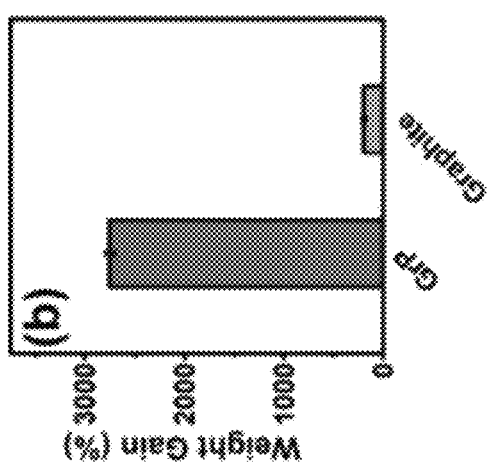
FIG. 7A is a histogram reporting the absorption capacity of graphene paper made according to the method disclosed herein for various oils and organic solvents as percent weight gain.
Figure 7B:
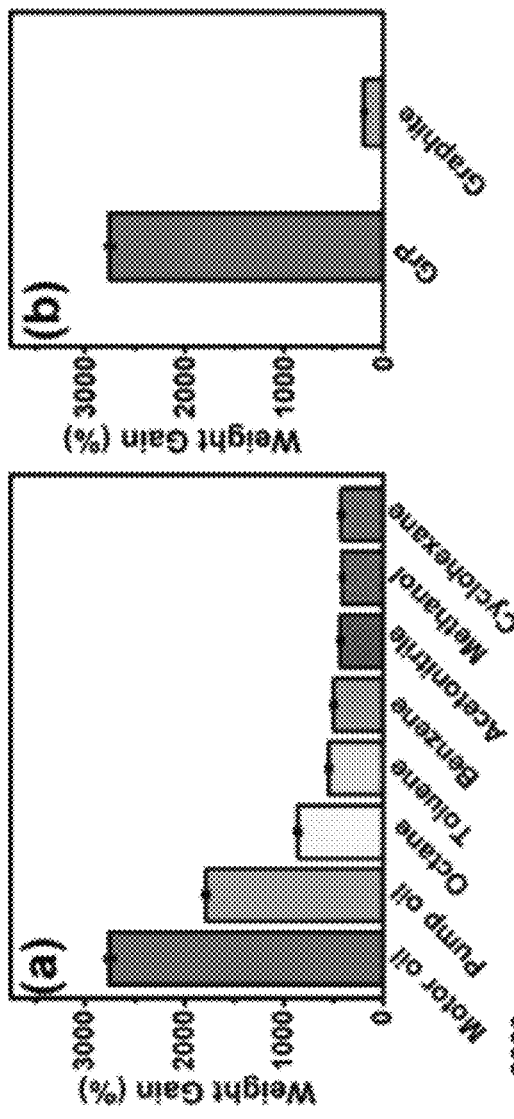
FIG. 7B is a histogram reporting the absorption capacity of graphene paper made according to the method disclosed herein for motor oil (and comparing the absorption to that of graphite).
Figure 7C:
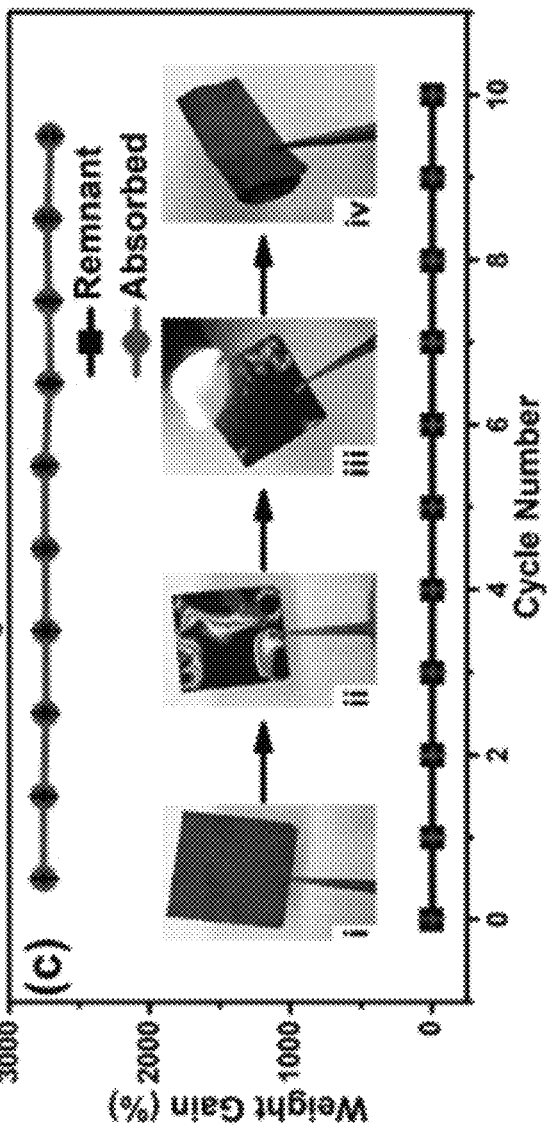
FIG. 7C is a series of photographs showing the reusability of the graphene paper as an absorbent for for motor oil. Insets are graphene paper before oil absorption (i) and after oil absorption (ii). The oil is the removed by burning (iii). The graphene paper remains flexible after the oil has been burned off (vi). The bottom and top traces show that the graphene paper retained its original weight (bottom trace) and absorption capacity (top trace) through ten cycles of absorbing oil and then burning it off.

FIGS. 6A, 6B, 6C, 6D, 6E, and 6F are a series of digital images of that show how the graphene paper made according to the method disclosed herein looks and behaves on a macro scale. FIGS. 6A and 6B show the graphene paper deposited on filter paper used to separate it, before and after drying (respectively. The dried, free-standing graphene paper was easily lifted from the filter paper using a tweezers. FIG. 6D shows the rough dimensions of the graphene paper made—a flexible disk of free-standing graphene roughly 30 mm in diameter. FIGS. 6E and 6F illustrate the beneficial and desirable flexibility of the resulting graphene paper, which could be folded onto itself (FIG. 6E) and spindled into a cone or funnel (FIG. 6F) without tearing or disintegrating. Oil Absorption Performance of the Graphene Paper:

The absorption results reveal that the graphene paper made according to the present method is capable of soaking various organic liquids and oils up to 28 times its weight. FIG. 7A. Compared to graphite, the graphene paper is about 15 times more absorbent. See FIG. 7B. It is also several times more absorbent that conventional absorbents, such as flexible macroporous polypropylene sponges, commercially available polypropylene fabric, nanowire membranes, and polydimethylsiloxane (PDMS) sponge. The superior oil and organic solvent absorption capability of the graphene paper is attributed to its porous, and layered microstructure, low density, excellent mechanical properties, and hydrophobicity. As shown in FIG. 7C, the graphene paper maintained its original paper-like morphology and high absorption capacity, changing by only 2%, after ten consecutive motor oil absorption/desorption cycles. These data demonstrate its superior stability and reusability. It is worth noting that many other 3D graphene platforms easily disintegrate during recycling. See, for example, Li et al. "Multifunctional nonwoven fabrics of interfused graphene fibres," *Nat. Commun.* 7 (2016). Furthermore, the sheet resistance of the graphene paper remained nearly unchanged during the test (data not shown), indicating virtually unaltered mechanical, chemical, and electrical properties throughout repeated uses.

REFERENCES

The following references are incorporated herein by reference.

1. Kumar, N. A., et al., *Graphene and molybdenum disulfide hybrids: synthesis and applications*. Materials Today, 2015. 18(5): p. 286-298.
2. Wang, M., et al., *Functional Three-Dimensional Graphene/Polymer Composites*. Acs Nano, 2016. 10(8): p. 7231-7247.
3. Joshi, R. K. and J. J. Schneider, *Assembly of one dimensional inorganic nanostructures into functional 2D and 3D architectures. Synthesis, arrangement and functionality*. Chemical Society Reviews, 2012. 41(15): p. 5285-5312.
4. Tsang, A. C. H., H. Y. H. Kwok, and D. Y. C. Leung, *The use of graphene based materials for fuel cell, photovoltaics, and supercapacitor electrode materials*. Solid State Sciences, 2017. 67: p. A1-A14.
5. Zhu, Y., et al., *Graphene and graphene oxide: synthesis, properties, and applications*. Adv Mater, 2010. 22(35): p. 3906-24.
6. Ke, Q. W., J., *Graphene-based materials for supercapacitor electrodes*. Journal of Materiomics, 2016. 2(1): p. 37-54.
7. Bonaccorso, F., et al., *Production and processing of graphene and 2d crystals*. Materials Today, 2012. 15(12): p. 564-589.
8. Vedhanarayanan, B., et al., *Exfoliation of Reduced Graphene Oxide with Self-Assembled pi-Gelators for Improved Electrochemical Performance*. ACS Appl Mater Interfaces, 2017. 9(23): p. 19417-19426.
9. Weiss, N. O., et al., *Graphene: an emerging electronic material*. Adv Mater, 2012. 24(43): p. 5782-825.
10. Li, Z. P., et al., *Flexible graphene/MnO2 composite papers for supercapacitor electrodes*. Journal of Materials Chemistry, 2011. 21(38): p. 14706-14711.
11. Liu, L. L., et al., *Nanostructured Graphene Composite Papers for Highly Flexible and Foldable Supercapacitors*. Advanced Materials, 2014. 26(28): p. 4855-+.
12. Ping, Y. J., et al., *Preparation of three-dimensional graphene foam for high performance supercapacitors*. Progress in Natural Science-Materials International, 2017. 27(2): p. 177-181.
13. Liu, W. W., et al., *Advanced Li-Ion Hybrid Supercapacitors Based on 3D Graphene-Foam Composites*. Acs Applied Materials & Interfaces, 2016. 8(39): p. 25941-25953.
14. Shao, Y. L., et al., *3D Freeze-Casting of Cellular Graphene Films for Ultrahigh-Power-Density Supercapacitors*. Advanced Materials, 2016. 28(31): p. 6719-+.
15. Liu, Y. Q., et al., *High-Performance Flexible All-Solid-State Supercapacitor from Large Free-Standing Graphene-PEDOT/PSS Films*. Scientific Reports, 2015. 5.
16. Moon, I. K., et al., *Lateral photovoltaic effect in flexible free-standing reduced graphene oxide film for self-powered position-sensitive detection* (vol 6, 33525, 2016). Scientific Reports, 2016. 6.
17. Liu, F., et al., *Folded structured graphene paper for high performance electrode materials*. Adv Mater, 2012. 24(8): p. 1089-94.
18. Pham, V. H. and J. H. Dickerson, *Reduced Graphene Oxide Hydrogels Deposited in Nickel Foam for Supercapacitor Applications: Toward High Volumetric Capacitance*. Journal of Physical Chemistry C, 2016. 120(10): p. 5353-5360.
19. Li, H., et al., *Compressed porous graphene particles for use as supercapacitor electrodes with excellent volumetric performance*. Nanoscale, 2015. 7(44): p. 18459-18463.
20. Guillermo A. Ferrero, D.M.S., Prof. Antonio B. Fuertes, *Flexible, Free-Standing and Holey Graphene Paper for High-Power Supercapacitors*. ChemNanoMat, 2016. 2(11): p. 1055-1063.
21. Jung, S. M., et al., *Controlled porous structures of graphene aerogels and their effect on supercapacitor performance*. Nanoscale, 2015. 7(10): p. 4386-4393.
22. Lehtimaki, S., et al., *Preparation of Supercapacitors on Flexible Substrates with Electrodeposited PEDOT/Graphene Composites*. Acs Applied Materials & Interfaces, 2015. 7(40): p. 22137-22147.
23. Strong, V., et al., *Patterning and Electronic Tuning of Laser Scribed Graphene for Flexible All-Carbon Devices*. Acs Nano, 2012. 6(2): p. 1395-1403.
24. Zhao, Y. Q., et al., *MnO2/graphene/nickel foam composite as high performance supercapacitor electrode via a facile electrochemical deposition strategy*. Materials Letters, 2012. 76: p. 127-130.
25. Zhang, Z. Y., et al., *Facile Synthesis of 3D MnO2-Graphene and Carbon Nanotube-Graphene Composite Networks for High-Performance, Flexible, All-Solid-State Asymmetric Supercapacitors*. Advanced Energy Materials, 2014. 4(10).
26. Huang, X., et al., *Graphene-based electrodes*. Adv Mater, 2012. 24(45): p. 5979-6004.
27. Blomquist, N., et al., *Large-Scale Production of Nanographite by Tube-Shear Exfoliation in Water*. Plos One, 2016. 11(4).
28. Chang, D. W. and J. B. Baek, *Eco-friendly synthesis of graphene nanoplatelets*. Journal of Materials Chemistry A, 2016. 4(40): p. 15281-15293.
29. Jayasena, B. and S. Subbiah, *A novel mechanical cleavage method for synthesizing few-layer graphenes*. Nanoscale Research Letters, 2011. 6.
30. Zhang, L., et al., *Controlled synthesis of few-layered graphene sheets on a large scale using chemical exfoliation*. Carbon, 2010. 48(8): p. 2367-2371.

31. Wang, Z. L., et al., *Facile, mild and fast thermal-decomposition reduction of graphene oxide in air and its application in high-performance lithium batteries.* Chemical Communications, 2012. 48(7): p. 976-978.
32. Yasri, N. G., A. K. Sundramoorthy, and S. Gunasekaran, *Azo dye functionalized graphene nanoplatelets for selective detection of bisphenol A and hydrogen peroxide.* Rsc Advances, 2015. 5(106): p. 87295-87305.
33. Sadak, O., A. K. Sundramoorthy, and S. Gunasekaran, *Highly selective colorimetric and electrochemical sensing of iron (III) using Nile red functionalized graphene film.* Biosens Bioelectron, 2017. 89(Pt 1): p. 430-436.
34. Mao, M., et al., *Simultaneous electrochemical synthesis of few-layer graphene flakes on both electrodes in protic ionic liquids.* Chemical Communications, 2013. 49(46): p. 5301-5303.
35. Patil, V., et al., *Graphene oxide and functionalized multi walled carbon nanotubes as epoxy curing agents: a novel synthetic approach to nanocomposites containing active nanostructured fillers.* Rsc Advances, 2014. 4(90): p. 49264-49272.
36. Huang, H., et al., *Highly efficient electrolytic exfoliation of graphite into graphene sheets based on Li ions intercalation-expansion-microexplosion mechanism.* Journal of Materials Chemistry, 2012. 22(21): p. 10452-10456.
37. Moon, I. K., et al., *Reduced graphene oxide by chemical graphitization.* Nat Commun, 2010. 1: p. 73.
38. Liang, M. H., et al., *High-Efficiency and Room-Temperature Reduction of Graphene Oxide: A Facile Green Approach Towards Flexible Graphene Films.* Small, 2012. 8(8): p. 1180-1184.
39. Jeon, I. Y., et al., *Formation of Large-Area Nitrogen-Doped Graphene Film Prepared from Simple Solution Casting of Edge-Selectively Functionalized Graphite and Its Electrocatalytic Activity.* Chemistry of Materials, 2011. 23(17): p. 3987-3992.
40. Cong, H. P., et al., *Flexible graphene-polyaniline composite paper for high-performance supercapacitor.* Energy & Environmental Science, 2013. 6(4): p. 1185-1191.
41. Liu, W. W., et al., *Flexible and conductive nanocomposite electrode based on graphene sheets and cotton cloth for supercapacitor.* Journal of Materials Chemistry, 2012. 22(33): p. 17245-17253.
42. Niu, Z. Q., et al., *A Leavening Strategy to Prepare Reduced Graphene Oxide Foams.* Advanced Materials, 2012. 24(30): p. 4144-4150.
43. Zhao, X., et al., *Flexible Holey Graphene Paper Electrodes with Enhanced Rate Capability for Energy Storage Applications.* Acs Nano, 2011. 5(11): p. 8739-8749.

What is claimed is:

1. A method of making free-standing graphene sheet not deposited on a surface or support layer, the method comprising:
   (a) passing an electric potential between a graphite-containing anode and a graphite-containing cathode disposed in a buffered aqueous electrolyte, at a voltage and amperage wherein partially oxidized graphene is exfoliated from the anode and/or the cathode into the electrolyte;
   (b) separating the partially oxidized graphene from the electrolyte and re-dispersing it in water or an aqueous solution to yield a dispersion;
   (c) acidifying the dispersion of step (b) to yield an acidified dispersion containing partially oxidized graphene sheets;
   (d) separating the partially oxidized graphene sheets from the acidified dispersion of step (c);
   (e) drying the partially oxidized graphene sheets to yield free-standing graphene sheets not deposited on a surface or support layer and having a carbon-to-oxygen ratio of at least about 8.0.

2. The method of claim 1, wherein step (a) comprises passing an electric potential of from about ±3.0 V to about ±100 V between the anode and the cathode.

3. The method of claim 2, wherein step (a) comprises passing an electric potential of about ±10 V between the anode and the cathode.

4. The method of claim 1, wherein step (a) comprises passing a constant electric potential between the anode and the cathode.

5. The method of claim 1, wherein step (a) comprises passing a varying electric potential between the anode and the cathode.

6. The method of claim 1, wherein the buffered aqueous electrolyte of step (a) is selected from phosphate-buffered saline, borate-buffered saline, Tris-buffered saline, Tris/Acetic Acid/EDTA buffer and Tris/Borate/EDTA buffer.

7. The method of claim 6, wherein the buffered aqueous electrolyte has a pH of between about 6.5 and about 7.5 and a concentration of from 0.05 M to 1.0 M.

8. The method of claim 6, wherein the buffered aqueous electrolyte has a pH of about 7.0.

9. The method of claim 1, wherein step (c) comprises acidifying the dispersion of step (b) to a pH of about 4.0 or lower.

10. The method of claim 9, wherein step (c) comprises acidifying the dispersion of step (b) to a pH of about 3.5 or lower.

11. The method claim 1, wherein in step (d) comprises separating the partially oxidized graphene sheets from the acidified dispersion of step (c) via vacuum filtration, wherein the partially oxidized graphene accumulates as a filter cake on a filter.

12. The method of claim 11, wherein step (d) comprises passing the acidified dispersion of step (c) through a filter having a nominal pore size of 0.2 µm or smaller.

13. The method of claim 1, wherein step (e) comprises air drying the partially oxidized graphene sheets.

14. The method of claim 1, wherein step (e) comprises air drying the partially oxidized graphene sheets to yield free-standing graphene sheets having a carbon-to-oxygen ratio of at least about 8.5.

15. The method of claim 1, wherein step (e) comprises air drying the partially oxidized graphene sheets to yield free-standing graphene sheets having a carbon-to-oxygen ratio of at least about 8.6.

* * * * *